United States Patent
Bhargava et al.

(10) Patent No.: US 7,376,701 B2
(45) Date of Patent: May 20, 2008

(54) SYSTEM AND METHODOLOGY FOR CONTROL OF, AND ACCESS AND RESPONSE TO INTERNET EMAIL FROM A WIRELESS DEVICE

(75) Inventors: Gautam Bhargava, Cupertino, CA (US); Slva V. Kumar, Menlo Park, CA (US)

(73) Assignee: Cisco Technology, Inc., San Jose, CA (US)

( * ) Notice: Subject to any disclaimer, the term of this patent is extended or adjusted under 35 U.S.C. 154(b) by 451 days.

(21) Appl. No.: 10/135,031

(22) Filed: Apr. 29, 2002

(65) Prior Publication Data
US 2003/0204568 A1 Oct. 30, 2003

(51) Int. Cl.
*G06F 15/16* (2006.01)
*G06F 15/173* (2006.01)

(52) U.S. Cl. .................... 709/206; 709/242
(58) Field of Classification Search ............ 709/206, 709/242, 238
See application file for complete search history.

(56) References Cited

U.S. PATENT DOCUMENTS

| | | | |
|---|---|---|---|
| 6,101,531 A * | 8/2000 | Eggleston et al. ......... 709/206 |
| 6,249,808 B1 * | 6/2001 | Seshadri .................. 709/206 |
| 6,532,446 B1 * | 3/2003 | King ....................... 704/270.1 |
| 6,650,890 B1 * | 11/2003 | Irlam et al. .............. 455/412.1 |
| 6,701,378 B1 * | 3/2004 | Gilhuly et al. ............ 709/249 |
| 2001/0042009 A1 * | 11/2001 | Peng ........................ 709/206 |
| 2001/0042099 A1 * | 11/2001 | Peng ........................ 709/206 |
| 2003/0088629 A1 * | 5/2003 | Berkowitz et al. ......... 709/206 |

* cited by examiner

*Primary Examiner*—Jason Cardone
*Assistant Examiner*—Brian J Gillis
(74) *Attorney, Agent, or Firm*—Trellis Intellectual Property Law Group, PC (57) ABSTRACT

The invention discloses a system and method for access and response to Internet emails, from a wireless device. The system extracts the emails from multiple Internet email accounts and forwards them, on the basis of pre-defined filter settings of the user, to the user's wireless device. The filter settings comprise filter criteria for identifying whether a new mail is to be forwarded to the wireless device or not, and content selection criteria for identifying parts of the new email to be sent to the wireless device. The system also enables the user to reply to the emails in a transparent manner whereby the replied message from the wireless device appears to have originated from the email address. The system also enables the user to dynamically change the filter settings using multi-modal inputs from his/her wireless device.

15 Claims, 6 Drawing Sheets

SYSTEM AND METHODOLOGY FOR CONTROL OF, AND ACCESS AND RESPONSE TO INTERNET EMAIL FROM A WIRELESS DEVICE

BACKGROUND

1. Field of the Invention

The present invention generally relates to multi-modal access to Internet emails from wireless devices. More particularly, the present invention relates to a system and method for receiving and sending Internet emails from a wireless device, with dynamic control using multi-modal input.

2. Description of Related Art

The advent of Internet has revolutionized the mode of communication. Internet has enabled its users to communicate with each other in a variety of ways. The users connected to the Internet can send messages and transmit large amounts of information easily from one computer to another computer. A popular way of communicating over the Internet is through the use of electronic mails (emails). Emails can be sent quickly, simply, and at negligible cost and sometimes they may even contain large amounts of information. For emails to work, each user has a mailbox with a unique email address. Various email service providers on the Internet provide such mailboxes. The user can access his/her mailbox by entering the unique email identity assigned to him/her and a corresponding password. The email is stored in the user's mailbox, and can be accessed by him/her at his convenience from any computer connected to the Internet.

Typically, to send or receive an Internet email, the user must have access to a computer connected to the Internet. However, there may be situations when the user receives an important email but is unable to read the same because he is away from his computer. For example, such a situation may arise when the user is in transit and does not have any means to be connected to the Internet. Indeed, even if the user has a laptop (or a portable computer), he may still not be able to connect to proper Internet connection (in the new location or in transit).

More recently, certain kinds of cellular phones, such as the Wireless Application Protocol (WAP) enabled phones, allow the users to access their Internet emails. WAP enabled phones provide high degree of mobility and enhanced accessibility to their users. WAP enabled phones, however, have some inherent limitations. For instance, Internet access through WAP enabled phones is very expensive and slow. Further, the availability of WAP services varies a great deal by geographical regions and is not always of high quality. Therefore, it is not possible for the user to stay continuously connected to the Internet. Further, WAP enabled phones are not very user-friendly.

Alternatively, an easy and inexpensive way of sending and receiving messages is through the use of portable radio receivers and trans-receivers such as wireless pagers. Wireless pagers enable its users to receive messages even while being away from the computer. In a more sophisticated paging system, the wireless pager may have the capability to not only receive a transmission from the service provider's system, but also to reply to the system. With the advances in paging technology, the usefulness of pagers as means of communication has expanded rapidly. However, pagers are dependent on the telephone network for their operation since the user is required to call a forwarding center and leave a message for the recipient. The forwarding center then passes the message on the recipient's pager. This process makes the system rather complex and time consuming. In addition, pagers do not provide facility for receiving Internet emails and also have limited display capability.

Over time, the concept of pagers has been extended to include forwarding of alerts related to Internet emails, and sometimes even forwarding these emails to wireless devices. The emails for recipients are stored at a central location called a server, and are regularly forwarded to the wireless device. Such a system enables the recipient to view the email messages, either partly or fully, on his/her wireless device.

Several patents relating to the receipt of emails by forwarding through a central server onto a wireless device have been granted, and some of these are mentioned hereinafter.

U.S. Pat. No. 5,978,837 titled "Intelligent pager for remotely managing email messages" has been assigned to AT & T Corp., New York, USA. This patent discloses a system where email messages are received on a pager through an email server. The pager directs the server to forward the email to a particular address. The email server sends a summary of the email message to the pager over a different network so that the pager can select a forwarding destination for the message. The pager sends a selection signal to the email server, which then forwards the email message to the selected destination.

U.S. Pat. No. 5,937,161 titled "Electronic message forwarding system" has been assigned to USA.NET, Inc., Colorado Springs, USA. This patent discloses a system for forwarding electronic messages in a data format that is compatible with a plurality of delivery destination technologies. For example, an email message can be converted to a bitmap image for tele-facsimile transmission, or a voice message for delivery to a telephone answering machine address. This system compares user provided data and message content to forward messages to selected addresses. In short, the system forwards electronic messages based upon user defined parameters such as time of receiving message, content of message, address of sender, and variable addresses of intended message recipient.

U.S. Pat. No. 5,987,100 titled "Universal Mailbox" and U.S. Pat. No. 6,203,192 titled "System and method for automatically delivering messages to a telecommunications device" have been assigned to Nortel Networks Limited, Ontario, Canada. These patents disclose a system that comprises a server in a telecommunications network with a universal mailbox. This server includes an element that translates the received information to a subscriber format compatible with the equipment of the subscriber. Another element automatically transfers the translated information to the subscriber equipment. The subscriber gets the email in the format supported by his handset, without having to initiate the transfer.

U.S. Pat. No. 6,118,856 titled "Method and apparatus for automatically forwarding an email message or portion thereof to a remote device" has been assigned to Nortel Networks Corporation, Ontario, Canada. This patent discloses a system capable of forwarding an email, or a portion of it, to remote devices in response to an email received by the server. In this patent, the user can define the particular remote device to which the email should be forwarded.

U.S. Pat. No. 6,219,694 titled "System and method for pushing information from a host system to a mobile data communication device having a shared electronic address" has been assigned to Research In Motion Limited, Waterloo, Canada. This patent discloses a system and method for pushing information from a host system to a mobile data communication device upon sensing a triggering event. One such triggering event could be the arrival of an Internet email. A "redirector" program operating at the host system enables a user to continuously redirect certain user-selected data items from the host system to the user's mobile data communication device once it detects one or more of user-defined triggering events. The mobile device and the host system share a common electronic address so that messages generated at either the device or the system are configured using the common electronic address.

Apart from the above-mentioned patents, several products also exist in market that facilitate sending and receiving of emails by the use of wireless devices. One such product is "Office Anywhere" from Conversational Computing Corporation, Washington, USA. This product allows users to access email, contact information, and calendar information that reside on a server platform. The user has to call into a system and then direct it, using voice commands, to access email, contact information or calendar information. The system reads out the requested information to the user. The user can also reply to a message in a "voice format," i.e., by speaking rather than typing. Similarly, "Email & Organize" service from Emerge, USA and "VoiceBack" service from Wireless2Web, USA reads out the emails over a wireless device and allows the users to send emails in a voice format.

Yet, another product is from Commtag, Cambridge, England. Commtag provides a wireless email product "Duality". "Duality" is software that provides synchronized access to desktop emails from wireless devices. These wireless devices include palmtops, pagers or pocket personal computers. "Duality" is an email push system that utilizes the "always connected" attribute of email networks to restore the near real time character of email delivery (that users enjoy over the corporate Local Area Network (LAN)). This product ensures that the users have the same view of their mail regardless of whether they are using the remote wireless device or their LAN connected desktop. This product also provides content based filtering of emails.

Although most patents and products mentioned above facilitate access of emails from a wireless handheld device, they suffer from one or more of the following disadvantages. To begin with, the user may not want to read all the mails that he receives in his Internet mailbox on his wireless device. The user may desire to read only certain mails with particular characteristics on his wireless device. Some of the existing systems forward all the emails received on the user's Internet mailbox to the wireless device with no control on the content and type of the mails that are being forwarded. This often leads to an overload of the device memory and it may also unnecessarily bother the user. Although some systems do provide means for filtering the emails to be sent, none of the systems provide for changing the filter conditions from dynamically. Once the filter conditions are set on these systems, these cannot be modified without accessing the host computer system (server or PC), thereby, making the product inflexible.

Another disadvantage of the existing systems is the lack of capability of handling several Internet email accounts. Many users today have several email accounts, and would like their emails received for each of their accounts to be forwarded to their wireless devices. Existing systems do not facilitate forwarding of emails from several email accounts. Another undesirable characteristic of some of the above mentioned systems pertain to the displayed address of the email replied from the wireless device. The reply sent through such systems is not transparent, i.e., the sender's address seen by the receiver of the reply, is that of the wireless device and not of the address to which he had sent his original mail. Yet another disadvantage of these existing systems pertains to the hardware requirements of the wireless device from which the emails are accessed. Certain systems require dedicated hardware (such as special pagers) to receive email notification. In order to use such systems, the user has to buy the specific equipment.

Another major disadvantage is the lack of multi-modal support. All current solutions work with either visual (graphical) or voice commands. It is not possible to give voice commands and get back the output in both voice and visual (i.e., multi-modal) form.

Therefore, in light of the drawbacks associated with the prior art, there is a need for a system and method that enables sending and receiving of emails from several Internet email accounts on any existing wireless device, such as mobile phones. A need also exists for a system and method that enables replying to Internet emails from wireless devices in a transparent manner. A need also exists for a system and method that enables dynamic changing of filter conditions for emails received on wireless device in a user-friendly manner. Finally, a need also exists for a system that can do all of the above in a multi-modal fashion—i.e., take commands in a visual(text) or voice medium and provide results in a visual/voice medium, depending on the capability of the output device.

SUMMARY

An object of the present invention is to provide for a system and method that enables access and response to Internet emails from a wireless device without any special Internet access capabilities.

A further object of the present invention is to provide for a system and method that enables accessing of emails on a wireless device from multiple Internet email accounts.

Another object of the present invention is to provide for a system and method that enables responding to emails from a wireless device to multiple Internet email accounts.

Yet another object of the present invention is to provide for a system and method that enables responding to emails from a wireless device in a transparent manner.

Yet another object of the present invention is to provide for a system and method that enables dynamic filtering of emails using multi-modal inputs from a wireless device.

The present invention relates to a system and method for access and response to Internet emails from a wireless device, using a host system. The host system extracts new email from multiple Internet email accounts and verifies whether the new email is to be forwarded to the user's wireless device, using the filter criteria. If the email is identified to be forwarded to the user, then parts of the email that need to be forwarded to the wireless device are identified, using the content selection criteria. Filter criteria and content selection criteria can be changed dynamically by the user using multi-modal inputs from the wireless device. The host system then converts the identified parts of the new email into a Short Message Service (SMS)/Multimedia Message Service (MMS) message and transmits the same to the wireless device of the user. MMS enables transmitting of messages containing text, graphics, photographic images, audio and video clips. The present invention also enables the user to reply to the accessed email in a manner similar to replying to an SMS/MMS message. Upon receipt of the reply from the wireless device, the host system converts the SMS/MMS message to an Simple Mail Transfer Protocol (SMTP) reply and sends it intended recipient i.e. the original sender, from the Internet email account at which the original email was received, thereby ensuring transparency of the wireless device in the reply.

BRIEF DESCRIPTION OF THE DRAWINGS

The preferred embodiments of the present invention will hereinafter be described in conjunction with the appended drawings provided to illustrate and not to limit the invention, wherein like designations denote like elements, and in which.

DESCRIPTION OF PREFERRED EMBODIMENTS

The present invention is directed to a system and method for access and transparent response to Internet emails from a plurality of mailboxes, from a wireless device, using multi-modal presentation and controls. The present invention enables the email messages that are received on an Internet email account to be read, whole or in part, on the wireless device. The present invention also enables replying to email message from the wireless device in a manner that the reply seem to originate from an email account and not from the wireless device. Further, the system can be controlled using a combination of dynamic voice/visual multi-modal commands.

Figure 1:
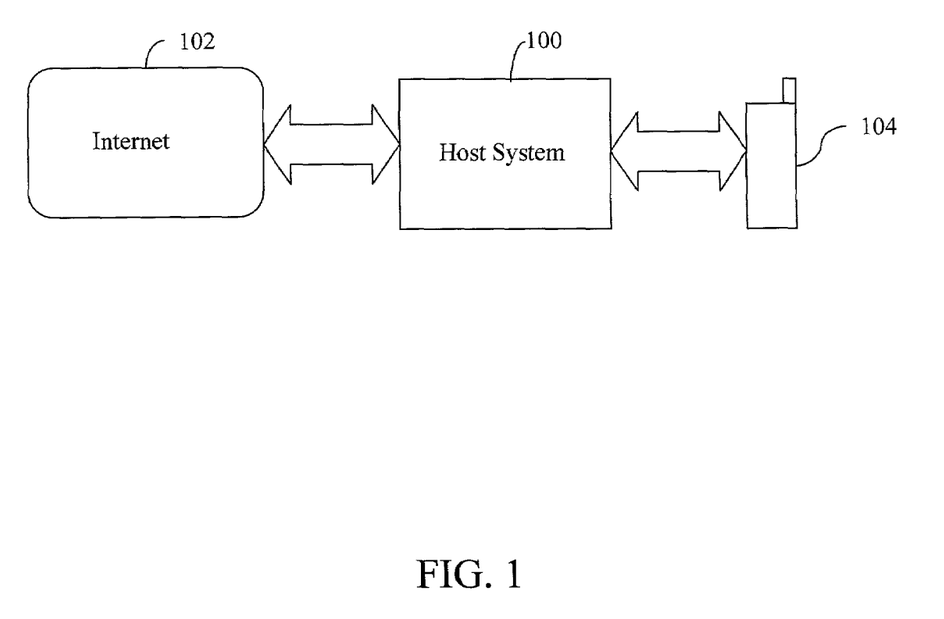
FIG. 1 is a block diagram that illustrates an overview of the system in accordance with a preferred embodiment of the present invention.

FIG. 1 is a block diagram that illustrates an overview of the system in accordance with a preferred embodiment of the present invention. The system comprises a host system 100 that is connected to the World Wide Web (WWW) 102, and a wireless device 104. Host system 100 accesses all Internet email accounts through WWW 102. The Internet email accounts are primarily Post Office Protocol (POP) email accounts on which a user receives emails, though the same idea is easily extended to other email systems using IMAP, or to proprietary email protocols such as Lotus, AOL, Hotmail, etc. POP email accounts typically are Internet email accounts that are accessed using POP. POP is a protocol for accessing e-mail messages that are temporarily stored on a server until copies are downloaded to the host system. With a POP client, the host system accesses the user's mailbox, retrieves messages sent to the user and otherwise manages them once they are offline.

Any new email received on the email account is extracted by host system 100 and forwarded to wireless device 104 of the user. Host system 100 manages two-way communication between the Internet environment and wireless device 104 of the user. Wireless device 104 can be any mobile phone available in the market, and is used for mobile telephony. Wireless device 104 does not require any special Internet capabilities (such as WAP) to access and respond to emails.

Various proactive delivery protocols can be utilized for two-way communication between wireless device 104 and host system 100. The preferred embodiment of the present invention uses the Short Message Service (SMS) and Multimedia Message Service (MMS) protocol. SMS and MMS are globally accepted wireless services that enable the transmission of messages between mobile subscribers and external systems. The Internet email is extracted by host system 100 and is converted to a form that can be sent as an SMS/MMS to wireless device 104 of the user. Once a forwarded email is received on wireless device 104, the user can reply to the message in the same manner as replying to a SMS/MMS message.

Host system 100 is capable of handling a plurality of email accounts. Therefore, the user can access emails from multiple POP email accounts from wireless device 104. Although the present invention is described in terms of POP mailboxes, it is apparent to one skilled in the art that the invention is applicable to all versions of the POP protocol such as POP V1, POP V2, POP V3. The invention is also readily extendable to IMAP mailboxes, which are used in corporate messaging systems or to proprietary email protocols such as Lotus, AOL, Hotmail, etc.

When a new email arrives on any of the multiple email accounts, host system 100 extracts it and identifies whether the new email is relevant. Relevant emails are those emails that are defined by the user to be forwarded to wireless device 104. Once an email has been identified as relevant email, host system 100 identifies the content of the email that is required to be forwarded. The relevant content of an email is also selected using the conditions set by the user. The conditions that check for the relevance of an email act as a filter for every new mail that the host retrieves from the user's Internet email account. Thus, only those emails that satisfy the filter conditions are selected by host system 100 for forwarding to wireless device 104. These conditions are also referred to as filter criteria. Conditions that identify the content of the email to be forwarded to wireless device 104 are referred to as content selection criteria. Filter criteria and content selection criteria provide regulated forwarding of emails to wireless device 104. Regulated forwarding of emails is required for controlling the volume of wireless communications and hence the associated tariff charges. Also, certain wireless devices have a capacity limitation, and therefore, regulated forwarding makes the invention applicable to any wireless device. Further, the user may not desire to read all his emails when in a mobile environment. Therefore, regulated forwarding delivers mails depending on the urgency of communication and the need to reach the user.

The filter criteria and the content selection criteria can be changed dynamically by the user i.e. users can change these criteria from their wireless device at any time. The change can be done using multi-modal inputs i.e. voice or text commands can be sent over wireless device 104 to change the two criteria. In this manner, the system's dynamic control over the process allows the user to regulate the forwarding process even when in the mobile environment.

The user on receiving the email on wireless device 104 can choose to reply to the email. The reply sent by the user is received by host system 100. Host system 100 identifies the sender of the original email to whom the reply is intended and sends the same to his/her email address. The reply appears to the sender as if it has originated from the Internet email account to which he/she had sent the original email and not wireless device 104. Therefore, wireless device 104, which has actually sent the email reply, remains transparent.

Host system 100 is a server system and is the main component of the invention. Host system 100 comprises hardware and software elements that enable it to perform its desired functionality. Host system 100 is mainly the recipient of the email both from the Internet as well wireless device 104, performing key operations and protocol translations to implement its functionality.

Figure 2:
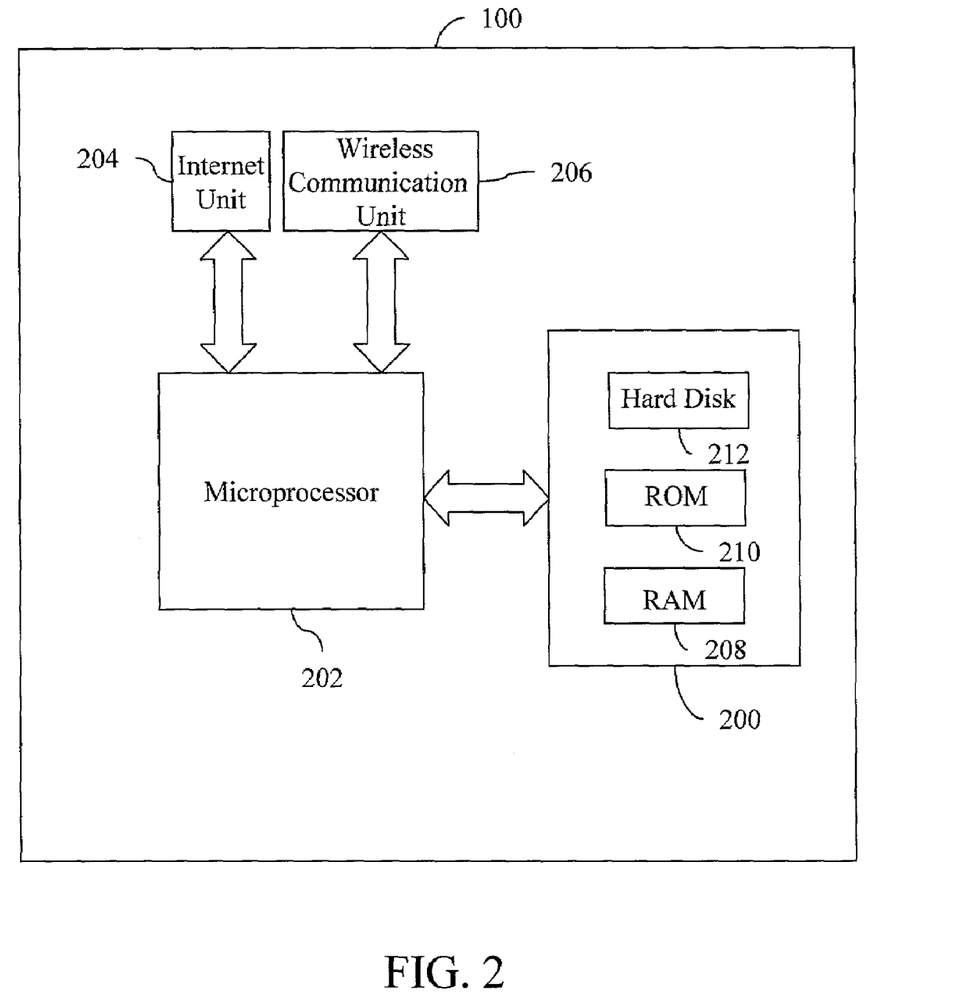
FIG. 2 is a block diagram of the host system in accordance with a preferred embodiment of the present invention.

FIG. 2 is a block diagram of host system 100 that describes the co-operation of its elements, in accordance with a preferred embodiment of the present invention. Host system 100 comprises a memory unit 200, a microprocessor 202, an Internet unit 204 and a wireless communication unit 206. Memory unit 200 further comprises a Random Access Memory (RAM) 208, a Read Only Memory (ROM) 210 and a hard disk 212. Internet unit 204 connects to WWW 102, while wireless communication unit 206 broadcasts signals to wireless device 104 held by the user. Wireless communication unit 206 also receives signals from wireless device 104.

Microprocessor 202 executes software programs residing ROM 210 or hard disk 212 using RAM 208. Host system 100 contains two software programs. The first program extracts the emails from multiple Internet mailboxes and filters the collected emails using the filter criteria. Thereafter, it identifies the parts of the email that need to be sent and composes an SMS or MMS message using these parts. It then forwards the message to wireless communication unit 206, which in turn sends the message to wireless device 104.

The user can reply to the received message in a manner as one would reply to SMS or MMS message. The reply is intercepted by host system 100. Microprocessor 202 executes a second software program that composes an email message of the received SMS message. The second program then forwards the email to Internet unit 204, which is connected to WWW 102, and the reply is sent as an email from the particular email account on which the original email was received.

Figure 3:
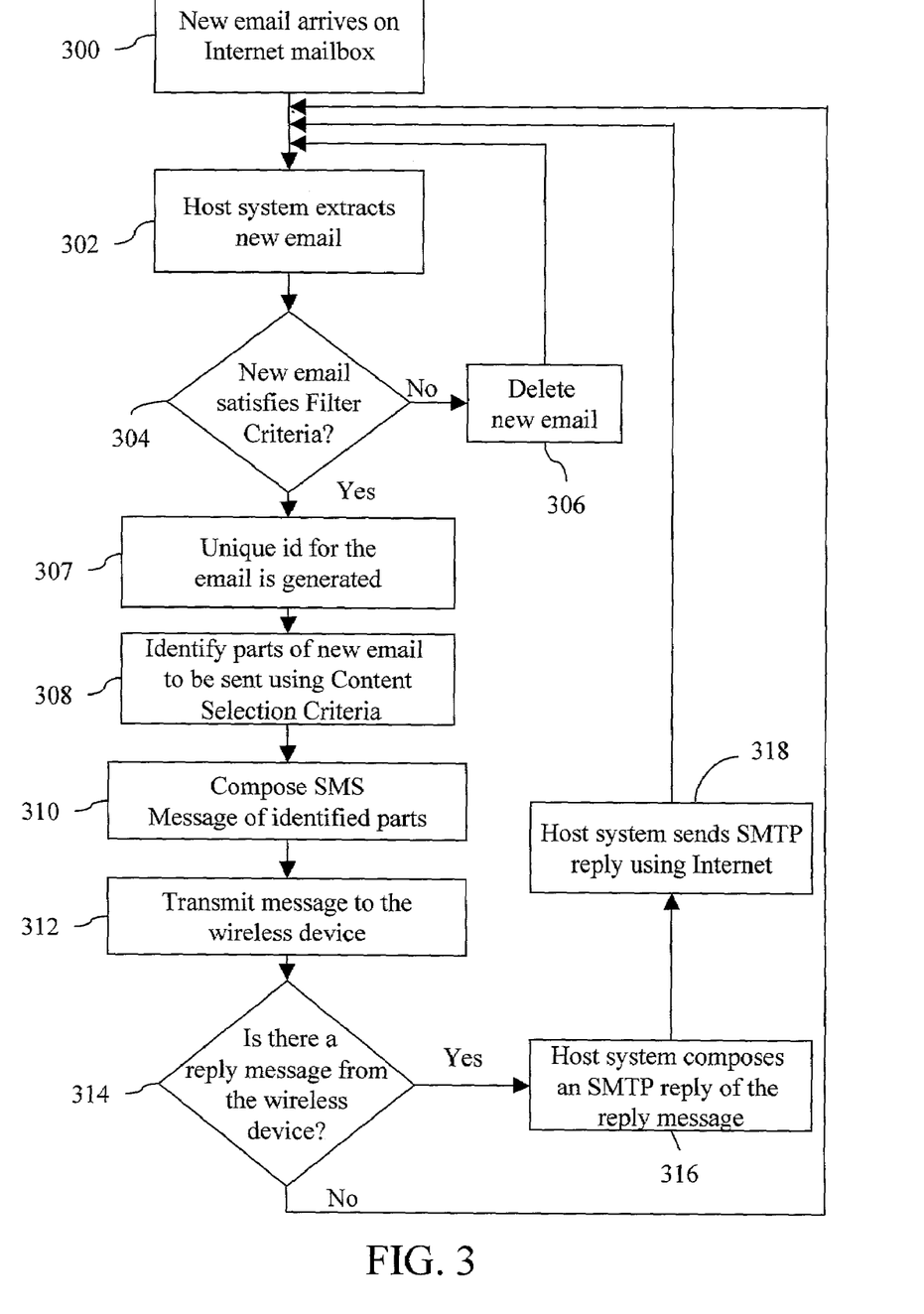
FIG. 3 is a flowchart that illustrates the method of access and response to Internet emails from a wireless device in accordance with a preferred embodiment of the present invention.

FIG. 3 is a flowchart that illustrates the method of access and response to Internet emails from a wireless device in accordance with a preferred embodiment of the present invention. Host system 100 keeps checking for emails from different Internet mailboxes. At 300 a new email arrives on one of the Internet mailboxes of the user. On detecting the arrival of a new email host system 100 extracts the same at 302 from the Internet, using Post Office Protocol.

At 304, host system 100 uses the filter criteria to verify whether the new email has to be forwarded to wireless device 104. To regulate the volume of email to be forwarded to a wireless device, each user has a particular set of filter criteria. In case the new email does not satisfy the filter criteria, it is deleted from host system 100, at 306. If the new mail satisfies the filter criteria, then a unique id is generated to uniquely identify the email at 307.

The filter criteria provide the user a way to regulate categories and types of email to be forwarded to wireless device 104. For, example, the user can specify that mails from only specific senders to be forwarded to his wireless device. The user can also specify that all mails arriving in a particular time interval be forwarded to him, or the user can specify certain keywords that will make the email urgent. The filter criteria can also be based on specific senders, urgency settings, header settings (to:, cc:, bcc:) and other Simple Mail Transfer Protocol (SMTP) categorization parameters. The filter criteria may also be based on keywords from the body of the email. The examples provided herein are not exhaustive and are merely for illustrative purpose. The filter criteria can be set as well as changed according to the user's preferences.

At 308, host system 100 identifies parts of the filtered email that are required to be sent to the users wireless device, using the content selection criteria. In a manner similar to filter criteria, the user can specify the content criteria of the email that should be forwarded to wireless device 104. The user may desire only certain section of the filtered email to be forwarded to him. The content selection criterion identifies the portions (such as headers only, headers and body, number of lines of the body, attachments, or a combination of one or more of these) that are to be forwarded to the user's wireless device as SMS or MMS. The user can set the same filter criteria and content selection criteria for all his mailboxes. The users can also set different conditions for different mailboxes.

The system provides dynamic control through multimodal input i.e. voice and data commands, over email filtering and delivery. Hence, the user can change the filter criteria and the content selection criteria values at any moment, from wireless device 104. If the filter criteria requires the email to be forwarded, host system 100 checks using the content selection criteria what parts of the email needs to be forwarded to wireless device 104. Thereafter, at 310, the system composes an SMS or MMS message of the email to be forwarded. The system can also send messages through Simple Mail Transfer Protocol (SMTP). At 312, the composed SMS or MMS message is sent to the user on wireless device 104.

The user of wireless device 104 on receipt of the SMS or MMS message determines whether he/she intends to reply. In case the user decides to reply at 314, the user enters the reply text in his wireless device and transmits the message. This message is received by host system 100. At 316, host system 100 composes an SMTP reply using the SMS reply received from wireless device 104. At 316, the SMTP reply is sent from the specific POP account from which the original email was sent. The reply sent by host system 100 appears to have been sent from an email account and not from a wireless device, thereby ensuring transparency of wireless device 104 in the process.

Figure 4:
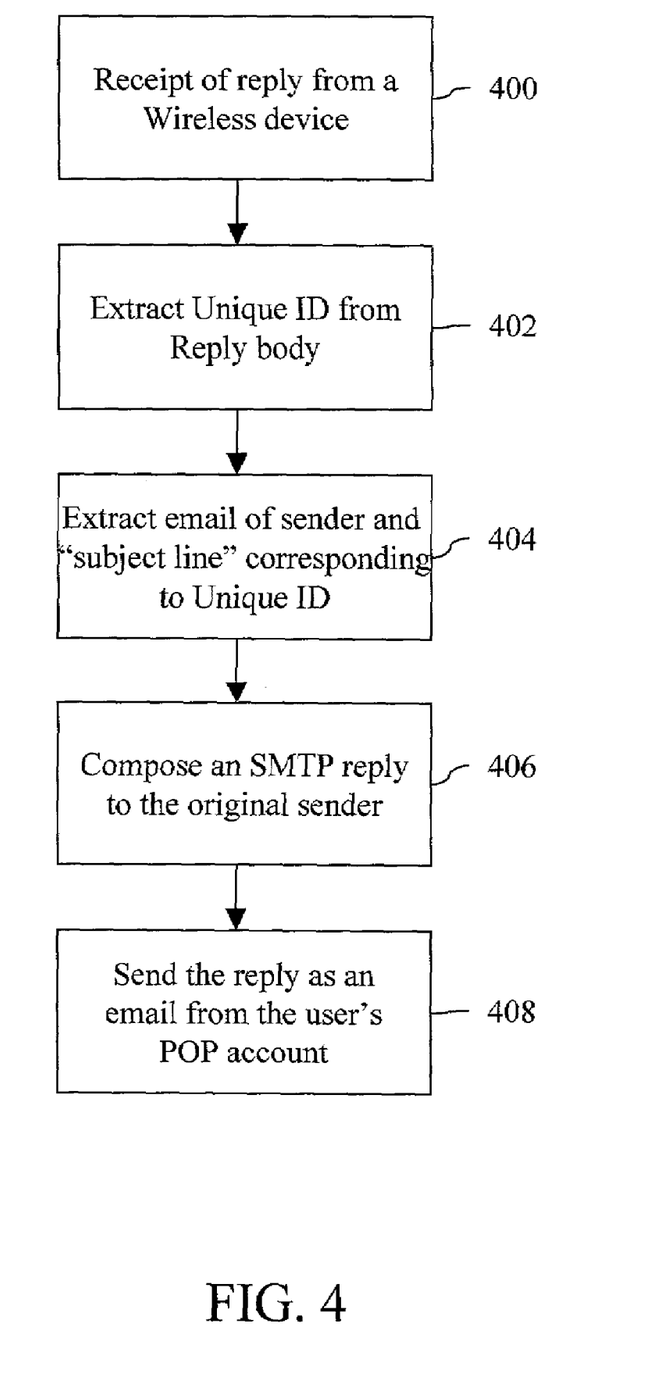
FIG. 4 is a flow chart that illustrates one implementation strategy for achieving a transparent reply in accordance with a preferred embodiment of the present invention.

A key aspect of the invention is the ability to send transparent replies from wireless device 104 to the Internet emails. This is achieved by the ability to match the original email from the sender with the SMS or MMS reply targeted to the sender of this email. In order to achieve this, host system 100 generates a unique id for each mail retrieved from the POP mailbox that satisfies the filter criteria. FIG. 4 is a flow chart that illustrates one implementation strategy for achieving transparent reply in accordance with a preferred embodiment of the present invention.

When a host system extracts the email using POP, it applies the filter criteria to the email to identify whether the new email is to be forwarded to wireless device 104. If the new email is to be forwarded then a unique number is generated, which is the unique id for this new email that is to be forwarded. This unique id is stored against the email address in a relational database. Along with the unique id, the email address of the sender, the POP account to which the email was sent and the subject line of the email are also stored in the relational database. Thereafter, host system 100 extracts the sender's identity, subject of the email and the message body from the email depending upon the content selection criteria defined by the user and composes a message. Host system 100 sends this message to the user's wireless device 104 using SMS or MMS. The format of the message sent to wireless device 104 is as follows:

F:<email sender>, S:<email subject>, I:<unique id>, B:<email body>.

It can be appreciated by one skilled in the art that the user may choose, by defining the content selection criteria, to receive only certain parts of the abovementioned format of the message. Therefore, the user may not desire to see the entire body of the email or may desire to receive only a certain section of the body of the email. The unique id, however, is always sent as part of the message to wireless device 104.

The user may choose to reply to the forwarded email. On receipt of the reply message from wireless device 104, at 400, host system 100 extracts the unique id from the body of the received reply, at 402. Thereafter, host system 100 maps the unique id to the information stored in relational database. Host system 100 extracts the email address of the sender, the POP account to which the email was sent and the subject line of the original email corresponding to the unique id of the SMS or MMS reply from the database at 404. At 406, host system 100 uses this information to compose an SMTP reply to the original sender with the extracted subject line from the database and the reply body from the SMS or MMS. Thereafter, at 408, host system 100 sends this reply from the specific email account to which the original email was sent. Therefore, the reply sent by host system 100 appears to have originated from an email address and not a wireless device, thereby ensuring transparency of wireless device 104 in the process.

Figure 5:
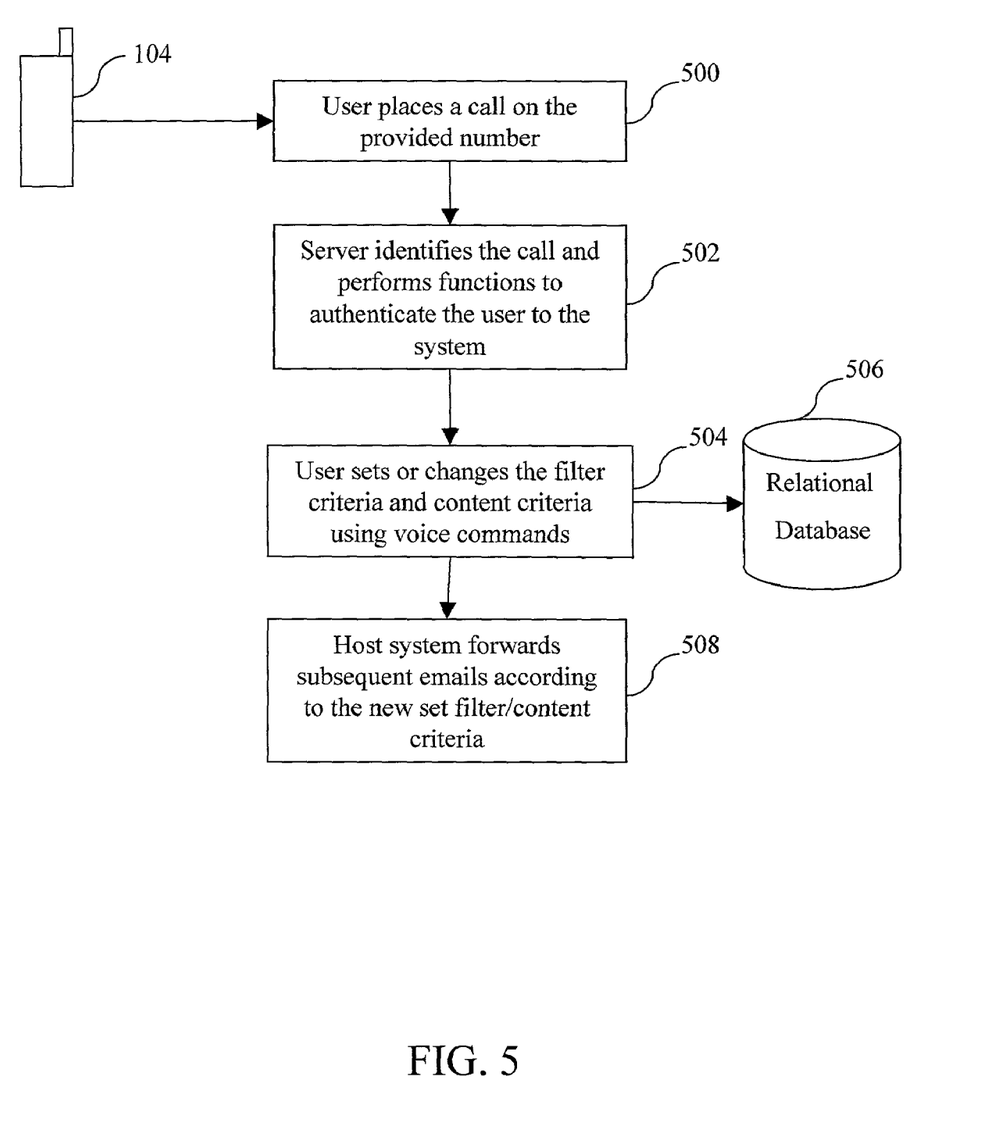
FIG. 5 is a flow diagram that illustrates the method of setting the filter criteria and content selection criteria in accordance with a preferred embodiment of the present invention.

FIG. 5 is a flow diagram that illustrates the method of setting the filter criteria and content selection criteria in accordance with a preferred embodiment of the present invention. The user can anytime, through wireless device 104, change the filter settings, i.e. filter criteria and content selection criteria, at host system 100 in accordance with his requirements. The user has the option to enable or disable certain features like forwarding of emails from a specific user, forwarding of emails of a specific importance level, forwarding of emails based on the addressing level such as to:, cc:, or bcc:, forwarding of emails containing specific key words in the subject header, forwarding of all emails from a specific POP account, forwarding of all emails, forwarding of email attachments, forwarding of email body and the like. The user can change these settings using voice commands.

The key advantage of using voice commands to change filters is that users can call in from any phone to enable/disable or otherwise change the filters. This present invention can be used in conjunction with the Vialto OneConnect technology that is described in commonly assigned U.S. patent application Ser. No. 10/015,026 filed on Dec. 11, 2001 and incorporated herein by reference, titled "System And Methodology For Voice Activated Access To Multiple Data Sources And Voice Repositories In A Single Session". Referring now to FIG. 5, the communication session begins at 500 with the user placing a phone call to a provided number using wireless device 104. This number lands on the telephony infrastructure provider's point of presence server. At 502, the server identifies that this call belongs to Vialto OneConnect technology system and it performs various functions to authenticate the user. The call is held on the incoming leg while an outbound leg is created to the Web Server. This leg is used to send a Hypertext Transfer Protocol HTTP request to the server. The Hypertext Transfer Protocol (HTTP) is the set of rules for exchanging files (text, graphic images, sound, video, and other multimedia files) on the World Wide Web. The HTTP is an application protocol. The server responds to this HTTP request with an Extensible Markup Language (XML) stream that is interpreted at the POP server. XML is a flexible way to create common information formats and share both the format and the data on the World Wide Web, intranets, and elsewhere. This first XML stream serves to authenticate the caller to the system. Once the user's credentials have been successfully established via the authentication protocol, the user can set or change the filter criteria and content selection criteria using voice commands at 504.

All interactions with the server are done using simple, natural language voice commands (such as "Enable email from John Smith", or "Enable email with keyword 'sales' in subject"). The user is in a constant request-fulfillment loop with the server. The server software prompts the user for a command and the user complies with an actionable data command. Once the user completes the setting of filters, he can hang up. All the filters set by the user are stored in a relational database at 506. Thereafter, according to the set filters, host system 100 forwards subsequent emails to wireless device 104, at 508. Although means for setting the filter criteria and the content selection criteria has be described in relation with Vialto OneConnect technology, it can be appreciated by one skilled in the art that any other similar means can be utilized to set the two criteria using voice or text commands.

As an alternative to voice commands, host system 100 also allows users to change email filters using SMS or MMS messages. This is done by sending an SMS or MMS message from the wireless phone to host system 100 in an appropriate format. For example, to turn off email forwarding from John Smith, the user can send an SMS message with the following text: "filter email off name john smith".

Figure 6:
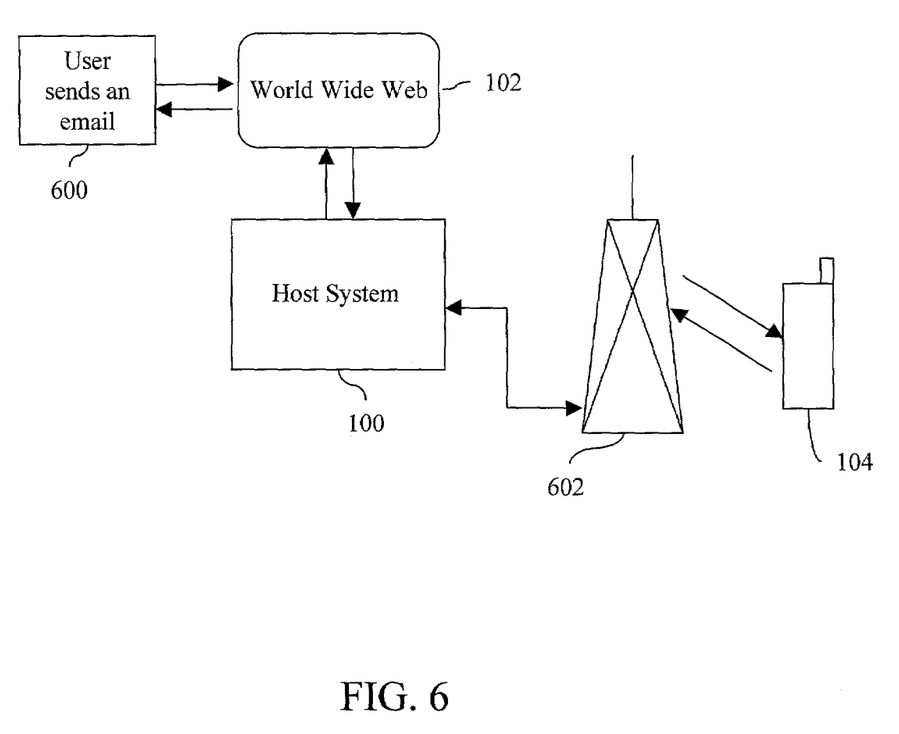
FIG. 6 is a flow diagram that illustrates with an example the working of the invention, in accordance with a preferred embodiment of the present invention, for a registered user Mike.

For people to use the system, they should be registered on host system 100. FIG. 6 is a flow diagram that illustrates with an example, the working of the invention, in accordance with a preferred embodiment of the present invention, for a registered user Mike.

At 600, Susan, a friend of Mike, sends Internet email from susan@corpmail.com to Mike. The email has the following format:

"To: mike@anymail.com

Subject: I just arrived in town

Body: Can we meet for lunch?"

The email lands at the regular email account of Mike i.e. mike@anymail.com on the World Wide Web 102.

Host system 100 regularly checks for arrival of new mails for its registered user, Mike. On arrival of new mail at Mike's account, i.e. at mike@anymail.com, host system 100 extracts the email from Mike's mailbox using the POP protocol. Thereafter, based on Mike's filter settings and content selection settings stored in host system 100, it recognizes that Mike would like Susan's email to be forwarded on to his wireless device and Mike would like the full content. A unique id 'I' is generated to uniquely identify the email. Host system 100 formats and forwards the email message to Mike's wireless device. This message is sent using the SMS protocol through the wireless service provider 604 along with the unique id 'I'. Mike receives the email on wireless device 104 in the following format:

"F: susan@corpmail.com

S: I just arrived in town

B: Can we meet for lunch?"

In case the there is some problem in sending the message using the SMS or the MMS protocol then SMTP protocol can be used. If the SMS or MMS protocol is used, the message is sent to Mike's wireless handset number, say 4085551234; if the SMTP protocol is used, the email is forwarded to the email account corresponding to Mike's wireless phone number i.e., 4085551234@mobilecarrier.net.

Upon receipt of the message on the wireless device, Mike can read the forwarded email and reply to it just as he would reply to SMS messages. The format of Mike's reply would be:

"Ok 1 pm at café y?"

This reply message is sent to host system 100 through wireless service provider 604 along with the unique id 'I'. Host system 100 correlates Mike's incoming reply message with the original email sent by Susan with the help of the unique id 'I'. Host system 100 interprets the "reply" message has come from 4085551234@mobilecarrier.net, the email address corresponding to Mike's wireless phone. After this correlation is done, a new email, with the content from Mike's reply message, is sent on as a reply to the originator Susan, with the correct email headers for Mike's original email account. The format of the email that is finally sent is as follows:

"From: mike@anymail.com
Re: I just arrived in town
Body: ok 1 pm at café y?"

As a result, Susan gets an email reply with content from 4085551234@mobilecarrier.net, but it appears to have come from the original address i.e. mike@anymail.com to which her email was sent.

In this way, host system 100 enables access and response of Internet emails to and from user's wireless device.

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims.

What is claimed is:

1. A method comprising:
receiving a first email wherein the first email includes a first sender's address and a recipient's address;
filtering the first email using a filter criteria to verify whether the first email is to be accessed by a wireless device;
generating a unique identity to identify the first email that is to be accessed by the wireless device;
storing the unique identity and the recipient's address in a database, the unique identity being associated with the recipient's address in the database;
identifying parts of the filtered first email to be forwarded to the wireless device using a content selection criteria;
sending a wireless email including identified parts of the filtered first email and the unique identity to the wireless device;
receiving a response including the unique identity of the wireless email from the wireless device, wherein the response includes a wireless sender's address;
converting the response to a second email;
using the unique identity to retrieve the recipient's address from the database for use in including the recipient's address as a second sender's address instead of the wireless sender's address;
including the retrieved recipient's address as a second sender's address in the second email instead of the wireless sender's address; and
sending the second email with the included recipient's address.

2. The method of claim 1, wherein sending the wireless email comprises sending the wireless email using a SMS and/or MMS protocol.

3. The method of claim 1, further comprising: receiving the filter criteria and content selection criteria from the wireless device.

4. The method of claim 1, wherein at least one of the filter criteria and content selection criteria are created in response to a voice command.

5. The method of claim 1, wherein at least one of the filter criteria and content selection criteria are created in response to a text message.

6. The method of claim 1, wherein email is received and/or sent using one or more of: a POP email account, an IMAP email account, a Lotus email account, a Hotmail email account and an AOL email account.

7. The method of claim 1, wherein the second email includes a sender's name that is used in at least one criterion.

8. The method of claim 1, wherein the second email includes a subject that is used in at least one criterion.

9. The method of claim 1, wherein the second email includes a body element that is used in at least one criterion.

10. The method of claim 1, wherein the response is sent from the wireless device using voice commands.

11. The method of claim 1, wherein the identified parts of the filtered first email sent to the wireless device are not stored in the database with the unique identity.

12. The method of claim 1, wherein the unique identity and the recipient's address are stored on a per received message basis in the database.

13. The method of claim 1, wherein the unique identity is mapped to the recipient's address included in the first email in the database and used to retrieve the recipient's address from the database, the recipient's address being one of a plurality of email addresses.

14. An apparatus comprising;
a processor;
a machine-readable medium including instructions executable by the processor for:
receiving a first email wherein the first email includes a first sender's address and a recipient's address;
filtering the first email using a filter criteria to verify whether the first email is to be accessed by a wireless device;
generating a unique identity to identify the first email that is to be accessed by the wireless device;
storing the unique identity and the recipient's address in a database, the unique identity being associated with the recipient's address in the database;
identifying parts of the filtered first email to be forwarded to the wireless device using a content selection criteria;
sending a wireless email including identified parts of the filtered first email and the unique identity to the wireless device
receiving a response including the unique identity of the wireless email from the wireless device, wherein the response includes a wireless sender's address;
converting the response to a second email;
using the unique identity to retrieve the recipient's address from the database for use in including the recipient's address as a second sender's address instead of the wireless sender's address;

including the retrieved recipient's address as a second sender's address in the second email instead of the wireless sender's address; and sending the second email with the included recipient's address to the first sender's address.

15. A machine-readable medium including instructions executable by a processor, the machine-readable medium comprising one or more instructions for:

receiving a first email wherein the first email includes a first sender's address and a recipient's address;

filtering the first email using a filter criteria to verify whether the first email is to be accessed by a wireless device;

generating a unique identity to identify the first email that is to be accessed by the wireless device;

storing the unique identity and the recipient's address in a database, the unique identity being associated with the recipient's address in the database;

identifying parts of the filtered first email to be forwarded to the wireless device using a content selection criteria;

sending a wireless email including identified parts of the filtered first email and the unique identity to the wireless device;

receiving a response including the unique identity of the wireless email from the wireless device, wherein the response includes a wireless sender's address;

converting the response to a second email;

using the unique identity to retrieve the recipient's address from the database for use in including the recipient's address as a second sender's address instead of the wireless sender's address;

including the retrieved recipient's address as a second sender's address in the second email instead of the wireless sender's address; and sending the second email with the included recipient's address to the first sender's address.

* * * * *